(12) United States Patent
Faller et al.

(10) Patent No.: US 9,878,695 B2
(45) Date of Patent: Jan. 30, 2018

(54) BRAKE BOOSTER

(71) Applicant: CONTINENTAL TEVES AG & CO. OHG, Frankfurt (DE)

(72) Inventors: Jürgen Faller, Kahl (DE); Ralf Jakobi, Flörsheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 401 days.

(21) Appl. No.: 14/428,132

(22) PCT Filed: Sep. 17, 2013

(86) PCT No.: PCT/EP2013/069307
§ 371 (c)(1),
(2) Date: Mar. 13, 2015

(87) PCT Pub. No.: WO2014/041201
PCT Pub. Date: Mar. 20, 2014

(65) Prior Publication Data
US 2015/0239447 A1 Aug. 27, 2015

(30) Foreign Application Priority Data

Sep. 17, 2012 (DE) ......................... 10 2012 216 585

(51) Int. Cl.
*B60T 13/57* (2006.01)
*B60T 13/567* (2006.01)
(52) U.S. Cl.
CPC ............ *B60T 13/567* (2013.01); *B60T 13/57* (2013.01)
(58) Field of Classification Search
CPC ...................................................... B60T 13/57
See application file for complete search history.

(56) References Cited

U.S. PATENT DOCUMENTS

2006/0288858 A1* 12/2006 Tsubouchi .............. B60T 13/57
91/369.2
2010/0109428 A1* 5/2010 Yamashita .............. B60T 13/57
303/31

FOREIGN PATENT DOCUMENTS

DE 102005013432 1/2006

OTHER PUBLICATIONS

International Search Report for International Application No. PCT/EP2013/069307 dated Feb. 4, 2014.
(Continued)

*Primary Examiner* — F. Daniel Lopez
(74) *Attorney, Agent, or Firm* — RatnerPrestia (57) ABSTRACT

A pneumatic brake booster for a motor vehicle having a booster housing, the interior space of which is divided by at least one axially movable wall loadable with a pneumatic differential pressure into at least one working chamber and at least one vacuum chamber. The movable wall includes a diaphragm plate and a rolling diaphragm which is arranged sealingly between the booster housing and the control housing, having a control valve which controls the differential pressure, is arranged in the control housing, and which controls a connection of the working chamber to the vacuum chamber or atmosphere, having at least one extraction duct which is integrated into the control housing for connection of the vacuum chamber to the working chamber, wherein the extraction duct can be blocked by the control valve. A device is also provided between the vacuum chamber and working chamber to improve the noise behavior.

10 Claims, 13 Drawing Sheets

(56) References Cited

OTHER PUBLICATIONS

Chinese Office Action for Chinese Application No. 201380048198.4, dated Jul. 7, 2016, including English translation, 9 pages.

* cited by examiner

PRIOR ART

BRAKE BOOSTER

CROSS REFERENCE TO RELATED APPLICATIONS

This is the U.S. National Phase Application of PCT International Application No. PCT/EP2013/069307, filed Sep. 17, 2013, and German Patent Application No. 10 2012 216 585.1, filed Sep. 17, 2012, the contents of such applications being incorporated by reference herein.

FIELD OF THE INVENTION

The invention relates to a pneumatic brake booster for motor vehicles, and to methods for operating same.

BACKGROUND OF THE INVENTION

Brake boosters of the type in question are sufficiently well known. In this case, a connection of the working chamber to atmosphere is opened by the control valve during a braking operation. As a result, a pressure difference builds up between the working chamber and the vacuum chamber, and the control housing is displaced in the direction of the vacuum chamber together with the movable wall. On completion of a braking operation, an air connection between the working chamber and the vacuum chamber is opened by the control valve, a process involving the unblocking of the extraction duct by the control valve. During this process, the control housing travels back in the direction of the working chamber together with the movable wall.

Because drive motor noises and other secondary noises are less and less perceptible in well insulated interiors of modern motor vehicles, the noise produced by many pneumatic brake boosters, which are generally in circulatory communication with the vehicle interior, is increasingly becoming a central concern and is generally regarded as disadvantageous. Noises which arise during the return of the control housing are often felt to be particularly troublesome, this state of affairs being more or less pronounced in different vehicle applications.

SUMMARY OF THE INVENTION

An aspect of the invention is pneumatic brake booster with improved noise behavior which can furthermore be adapted easily and economically to specific requirements in different vehicle applications.

According to an aspect of the invention, means for influencing fluid dynamics in the extraction duct between the vacuum chamber and the working chamber are provided.

As a result, the air flow between the working chamber and the control valve can be influenced in such a way that the noise emissions caused by the air flow can advantageously be influenced and reduced selectively. In particular, it is thereby possible to achieve several versions of a brake booster or derivatives of a basic version, each with different noise emission behavior which is reduced as compared with the basic version.

In an advantageous development of the invention, means for influencing the fluid dynamics are designed in such a way that they selectively increase a flow resistance in the extraction duct, making it a particularly simple matter to selectively reduce the fluid dynamics of the air masses in the extraction duct and to reduce the noise emissions.

In another advantageous development, this can be achieved in a particularly efficient way if the means for influencing the fluid dynamics are designed to reduce the hydraulic cross section of the extraction duct.

In a first embodiment the means for influencing the fluid dynamics are configured as at least one insert element for insertion into the extraction duct, thereby making it possible to achieve the stated technical object in a particularly simple way, e.g. through subsequent reversible modification of an already existing basic version of the brake booster, and to obtain a multiplicity of brake boosters with respectively adapted noise emissions in a particularly effective way.

In an advantageous development, particularly fine and accurate selective influencing of the flow resistance can be achieved if the insert element has at least one air-permeable aperture.

One embodiment envisages that the insert element is designed as an arcuate element, thereby allowing simple adaptation to the geometry of the air duct and achieving reliable seating of the insert element in the air duct.

In another embodiment the insert element can be designed as a ring element, thereby significantly simplifying the installation thereof.

In a particularly advantageous development, the insert element can be designed to be fixable in at least one defined circular position in the control housing, wherein the fixing is formed by means of at least one recess and a latching projection engaging in the recess. By this means, reliable seating during the operation of the brake booster is ensured and assembly errors are avoided.

In another embodiment the means for influencing the fluid dynamics can be designed in such a way that they reduce air permeability in the extraction duct, being made from a foamed or sintered air-permeable material or containing such a material, for example. As a result, the air flow can be influenced in a particularly uniform way and unwanted sources of noise, such as flow separations, can be prevented in an effective way.

In a particularly advantageous development, one or more filter inserts can be provided for insertion into the extraction duct.

In another advantageous embodiment particularly in conjunction with a control housing that can be produced in an injection molding process, the dimensions of a through-flow cross section of the extraction duct can be made variable by using suitable interchangeable inserts in the injection mold, whereby the through-flow cross section of the extraction duct can be reduced as compared with a basic version of the control housing according to requirements and defined demands of a particular desired application. It is thereby possible to achieve a particularly operationally reliable solution and to reduce a high outlay on assembly.

In another advantageous embodiment of the invention, the guide plate can have a reduced cumulative through-flow cross section of the apertures as compared with the basic version, whereby the desired effect is achieved and the flow resistance in the extraction duct is increased by means of a simple modification of a relatively low cost component without prejudicing original assembly processes.

In an advantageous method noise emissions from a pneumatic brake booster can be reduced in a particularly simple way and the method can be applied as required to a multiplicity of design variants of the brake booster if the noise emissions from a basic version of a brake booster are determined in a first step in a particular vehicle application, and means for influencing fluid dynamics in the extraction duct are used on the basic version in a further step in order to create a further version or design variants of the brake booster, wherein the further version of the brake booster has a reduced return speed of the control housing as compared with the basic version.

In an advantageous development of the abovementioned method, the abovementioned advantage is achieved by virtue of the fact that the further version of the brake booster is provided a guide plate having a reduced cumulative area of the through-flow cross section of the apertures as compared with the basic version.

Further details, features, advantages and possible uses of aspects of the invention will become apparent from the claims together with the description and the drawings.

DESCRIPTION OF THE FIGURES

Since a fundamental construction and operation of a pneumatic brake booster are sufficiently well known, it is only and especially those elements and sequences which are relevant to the invention which will be explored below. Corresponding components and design elements are provided with the same reference signs where possible. In what follows:

FIG. 9 shows a tenth illustrative embodiment of a brake booster according to an aspect of the invention with variation to the valve plunger.

DETAILED DESCRIPTION OF THE PREFERRED EMBODIMENTS

Figure 1:
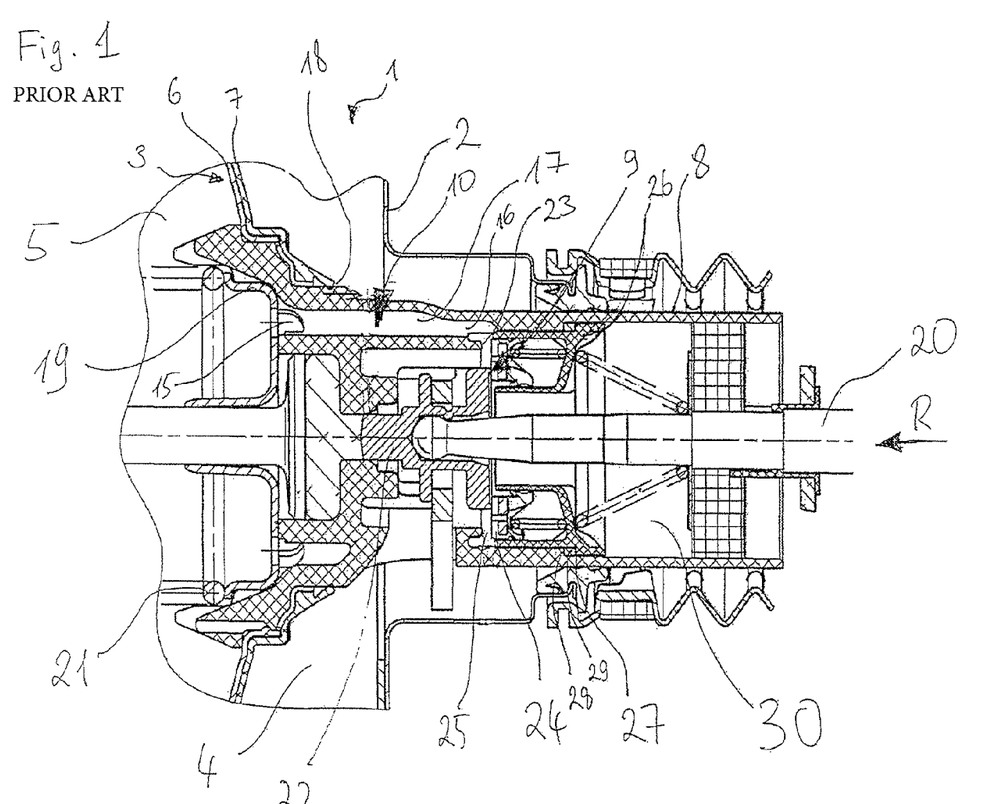
FIG. 1 shows a part section through a known brake booster in the region of the control housing in the return position.

FIG. 1

FIG. 1 shows a part section through a known pneumatic brake booster 1. The interior space of the schematically indicated booster housing 2 is divided by an axially movable wall 3 into a working chamber 4 and a vacuum chamber 5. The movable wall 3 comprises a diaphragm plate 6 and a rolling diaphragm 7. A control housing 8 is clamped in the booster housing 2 between a piston rod 20 and a return spring 21 in such a way as to be axially movable in an actuating direction R, wherein the return spring 21 is supported on the control housing 8 via a guide plate 19. In this case, the rolling diaphragm 7 rests sealingly on the control housing 8 by means of an encircling sealing lip 18 at its radial inner edge and is connected, e.g. clamped, sealingly to the booster housing 2 at its other, radial outer edge (not shown).

In order to allow controllable air exchange between the working chamber 4 and the vacuum chamber 5, an extraction duct 10 is provided, which can be blocked by a control valve 9. The extraction duct 10 forms a pneumatic connection between the vacuum chamber 5 and the control valve 9 and generally has a radially encircling sealing groove 15 and an annular gap 16, which are connected by one or more connecting ducts 17. In this case, a number of apertures 12 is provided in the guide plate 19 of the known brake booster 1, said apertures allowing as far as possible unhindered air exchange between the working chamber 4 and the control valve 9, and therefore as large as possible a cross section to allow through the air masses is sought while maintaining sufficient dimensional stability for the support of the return spring 21.

A disk valve 24 is arranged in an axially sprung manner in a holder 26. The holder 26 is mounted within the control housing 8, wherein the axial position in the actuating direction R is substantially determined by an encircling stop 27, a corresponding shoulder 28 and an intermediate ring 29. However, solutions without an intermediate ring 29 are also possible.

The control valve 9 interacts by means of the disk valve 24 with a valve plunger 22 and a sealing edge 23 in such a way that an air connection between the working chamber 4 and the vacuum chamber 5 can be established by raising the sealing edge 23 from the disk valve 24 when required by moving the disk valve 24 backwards by means of the valve plunger 22, i.e. counter to the actuating direction R. In this case, an extraction gap 25, through which air exchange takes place between the working chamber 4 and the vacuum chamber 5, is formed between the sealing edge 23 and the disk valve 24. This generally occurs upon completion of a braking operation and, owing to the pressure equalization into the working chamber 4 and the vacuum chamber 5 and to a force exerted on the control housing 8 by the return spring, causes a return movement of the control housing 8 together with the wall 3. A "return position" of this kind is depicted in FIG. 1.

During a braking operation, on the other hand, an air connection is established between the working chamber 4 and atmosphere by raising the valve plunger 22 from the disk valve 24 in actuating direction R and thereby enabling air exchange between the working chamber 4 and a housing interior space 30, which surrounds the piston rod 20 and which is generally connected to the vehicle interior.

Figure 2:
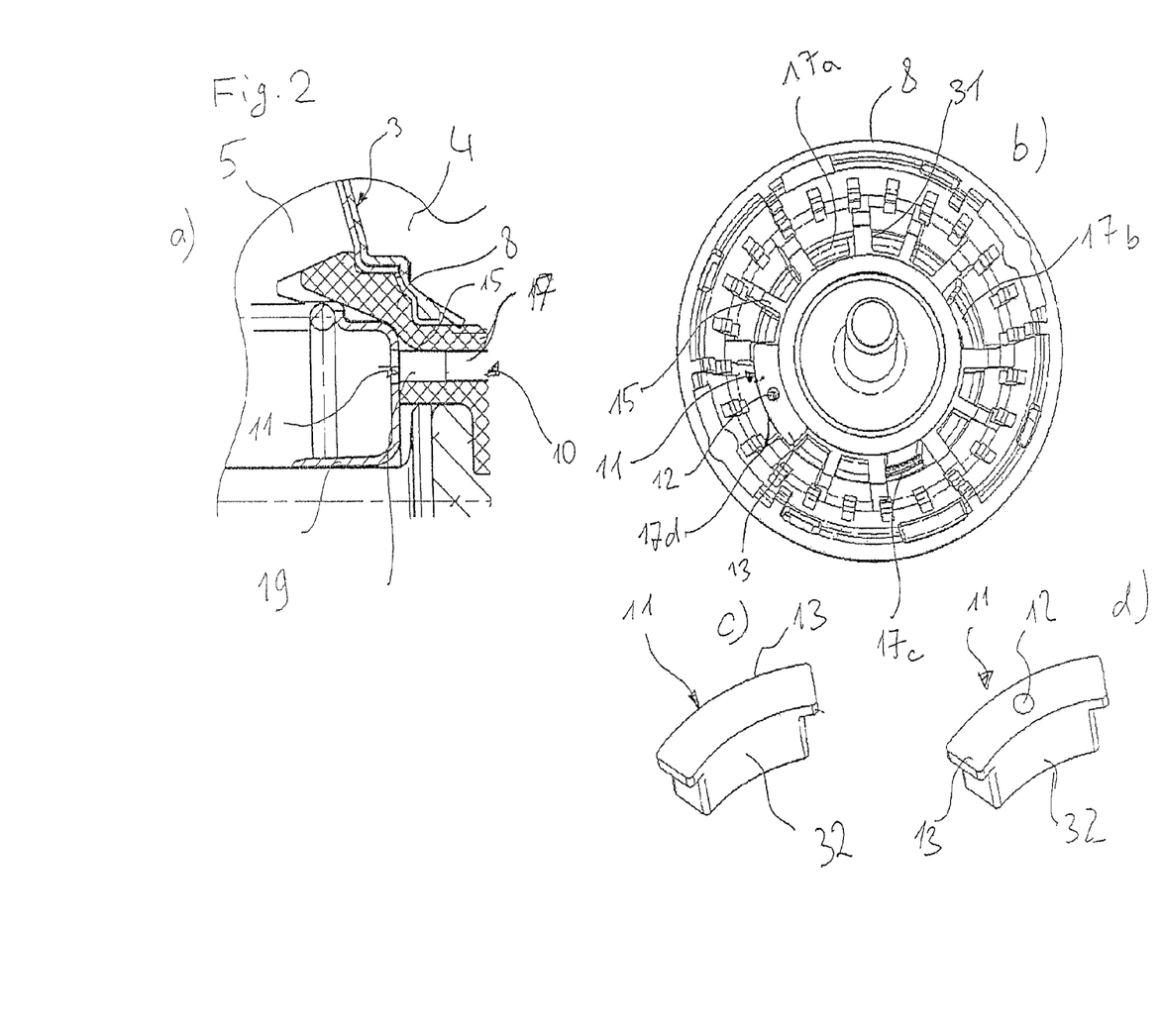
FIG. 2 shows a first illustrative embodiment of a brake booster according to an aspect of the invention having arcuate inserts.

FIG. 2

FIG. 2 shows a first embodiment of a brake booster according to an aspect of the invention. From the part section in view "a", it can be seen that an insert element 11, which projects into the connecting duct 17 and blocks the latter, is arranged in the region of the annular groove 15 in the control housing 8.

From views "c" and "d", it can be seen that the insert element 11 in the embodiment illustrated is designed as an arcuate element 13, the circularity of which is matched to the annular groove 15. The arcuate element 13 has a molded extension 32, which extends in the axial direction and is narrower in its circular extent than the arcuate element 13. In view "d", the insert element 11 additionally has an aperture 12, which allows air to pass through the insert element 11. Apertures with different cross sections are conceivable within the invention.

In the perspective illustration "b", it can be seen that the control housing 8 has a total of four connecting ducts 17a-d, which open into the annular groove 15. In this case, connecting duct 17d is blocked by an insert element 11 having the aperture 12, wherein the molded extension 32 projects into connecting duct 17d and the arcuate element 13 rests on the ribs 31. As a result, connecting duct 17d is partially blocked and a hydraulic cross section of the extraction duct 10 is reduced. If required, a plurality of inserts 11 can be used to block further connecting ducts 17a,b,c in order to reduce the hydraulic cross section of the extraction duct 10 even further.

A hydraulic cross section is a conventional auxiliary variable in fluid dynamics used to assess flow behaviors in flow ducts with noncircular cross sections. The hydraulic cross section is calculated as four times a through-flow cross section of the flow duct divided by the wetted circumference of the flow duct. Qualitatively, it can be stated that, with constant fluid masses, e.g. air masses, passing through a flow duct, a reduction in the hydraulic cross section of the flow duct causes an increase in flow resistance.

Owing to the reduction in the hydraulic cross section, the air masses require more time for the transfer between the vacuum chamber 5 and the working chamber 4 with otherwise constant boundary conditions because of the increased flow resistance. The return of the control housing 8 and pressure equalization take place more slowly and the dynamics are reduced. Moreover, there is an increase in the damping action due to a longer-lasting pressure in the working chamber 4, which is higher than the pressure in the vacuum chamber 5. Overall, the abovementioned effects lead to a significant reduction in noise emissions during the return of the control housing 8.

From view a), it can furthermore be seen that the inserts 11 are arranged between the control housing 8 and the guide plate 19 in the assembled state of the brake booster 1 and, as a result, are secured in a positionally fixed manner.

Embodiments with a different number of connecting ducts 17 are likewise possible within the invention.

Figure 3:
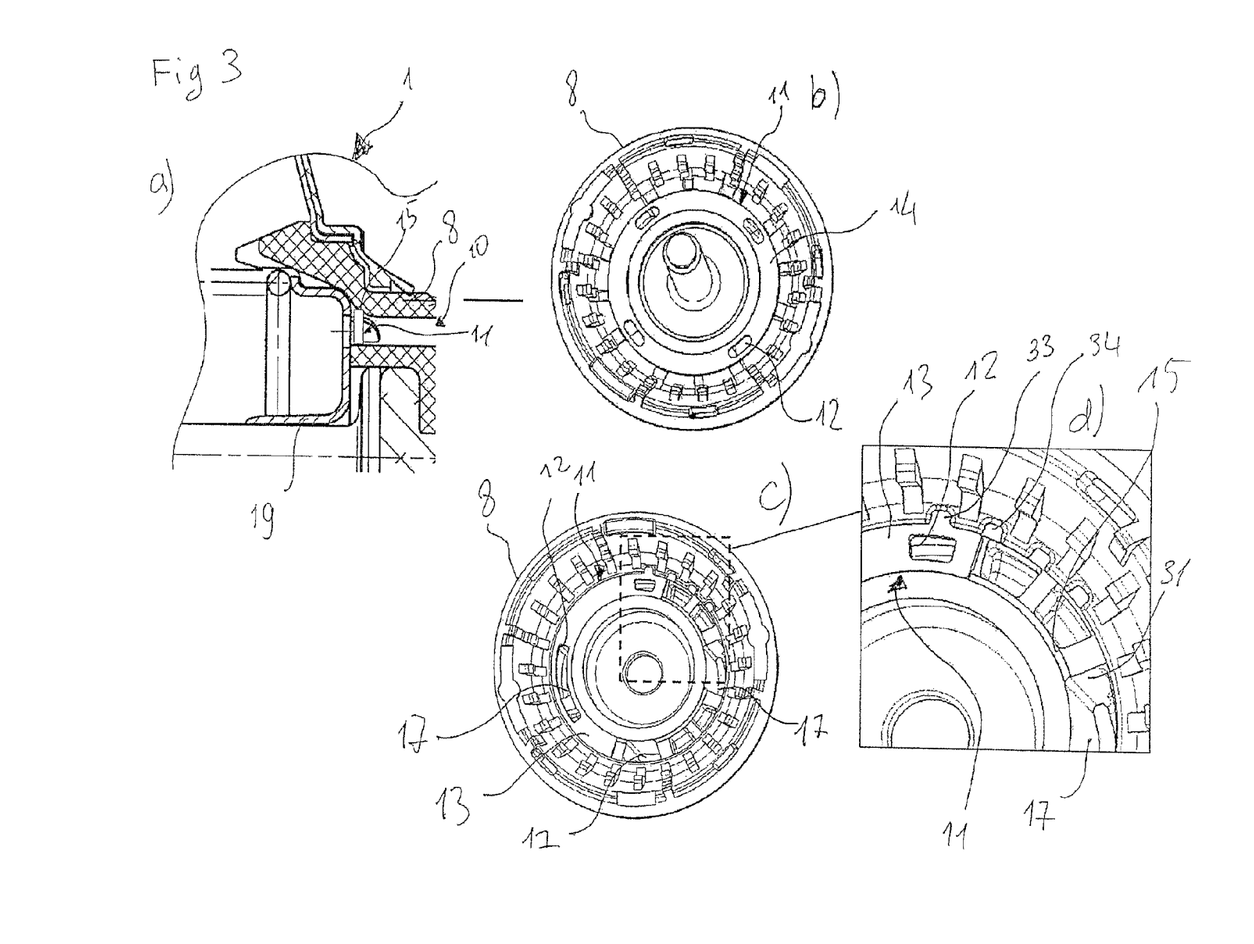
FIG. 3 shows a second and a third illustrative embodiment of a brake booster according to the invention with an annular insert (3a) and an aspect of a further arcuate insert (3b).

FIG. 3

Two further illustrative embodiments of the brake booster 1 according to an aspect of the invention are shown in FIG. 3. In contrast to the embodiments according to FIG. 2, the inserts 11 in the embodiments shown do not have molded extensions 32 and therefore do not project into the connecting ducts 17 but merely cover these in the region of the annular groove 15. Apertures 12 for allowing air masses through the inserts are provided.

In this case, the number, shape, cross-sectional area and position of apertures 12 in an insert element 11 can very much be configured differently in order to achieve the purpose envisaged. Here, the purpose envisaged is limiting the air mass flow through the extraction duct 10 to a desired extent through a selective reduction in the hydraulic cross section which would be available in an initial or basic version of the control housing 8 without the inserts 11 in the extraction duct 10.

The insert element in view "b" is configured as a ring element 14, which covers the annular groove more or less completely and allows air mass exchange largely or exclusively through the apertures 12.

The insert element in view "c" is configured as an arcuate element 13, wherein the circular extent thereof is chosen so that it can cover more than just one connecting duct 17.

In a development of the invention, latching for precise circular positioning of an arcuate element 13 or a disk 14 can additionally be provided, as shown, in particular, in detail view "d". The arcuate element has a latching projection 33, which engages in a recess 34 and can thus be supported in the control housing in a manner secured against twisting in a desired particular circular position. It is possible to provide a plurality of recesses in order to be able to represent a variety of circular positions and thus allow different overlaps of the connecting ducts 17 with just a single arcuate element 14. It is thereby possible to achieve a plurality of variants of the brake booster 1 with different return speeds of the control housing 8 in a simple and cost efficient manner using a single insert element 11.

Combinations similar to coding of a plurality of latching projections and/or of differently shaped latching projections and corresponding recesses are also conceivable in order reliably to allow only certain spatial positions of the arcuate element 13 or ring element 14 and thus to simplify the installation thereof and avoid incorrect installation, e.g. mirror-reversed installation.

In this case, latching elements can also be designed differently, e.g. as axially upward-projecting stop elements on the insert element 11, which interact with the ribs 31 and, at the same time, prevent mirror-reversed installation of the insert element 11 equipped therewith.

Figure 4:
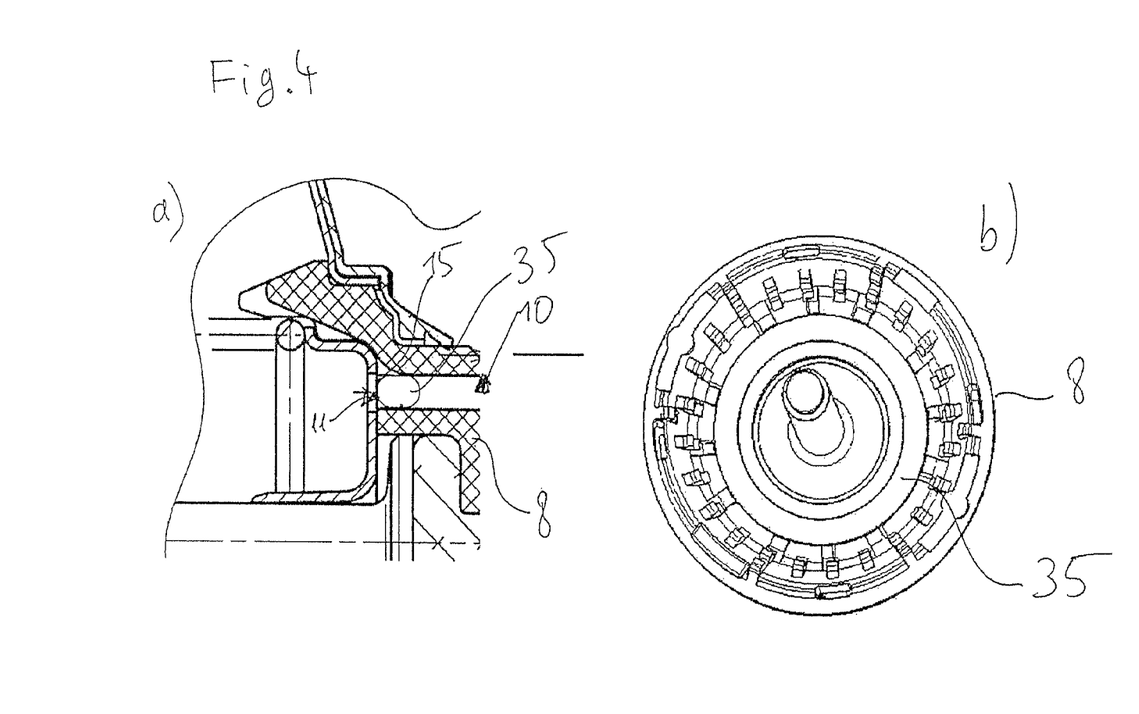
FIG. 4 shows a fourth illustrative embodiment of a brake booster according to an aspect of the invention with a filter insert.

FIG. 4

FIG. 4 shows another embodiment of an aspect of the invention, in which the insert element 11 is configured as filter ring 35. The filter ring can be produced from a foamed or sintered material, e.g. a sponge material, and covers the entire extraction duct 10 in the region of the annular groove 15.

Through reduced air permeability, such materials, by their very nature, cause a higher flow resistance in the throughflowing media. By selecting an appropriate material and suitable dimensioning, it is thus possible selectively to increase the flow resistance in the extraction duct 10 and to reduce the return speed of the control housing 8. Moreover, such filter ring 35 can be produced at very low cost and can be installed in a particularly simple manner and in a way which avoids errors.

Figure 5:
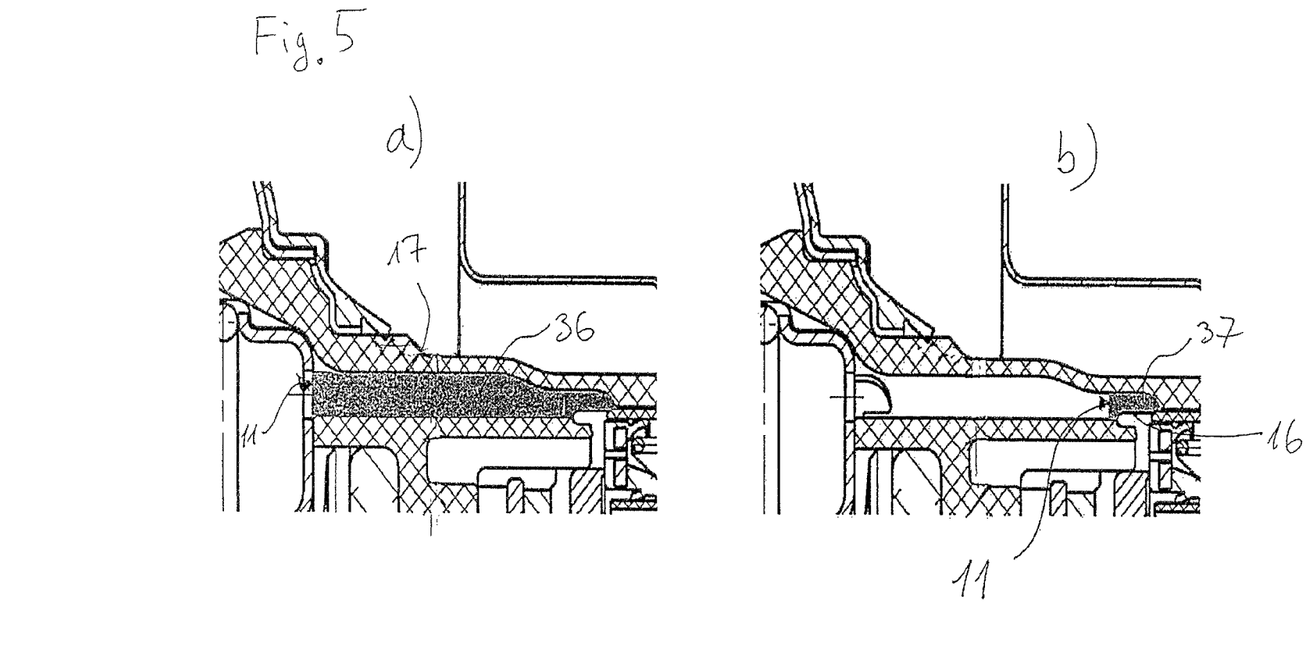
FIG. 5 shows a fifth and a sixth illustrative embodiment of a brake booster according to an aspect of the invention.

FIG. 5

FIG. 5 shows two further illustrative embodiments with inserts 11, which operate according to the same principle of action to that described in FIG. 4 but are differently shaped and positioned.

In view "a", in contrast to FIG. 4, the insert element 11 is configured as a filter insert 36 for insertion into the connecting duct 17.

The insert element 11 in view "b" is shaped as a filter tube 37 and arranged in the annular gap 16.

Figure 6:
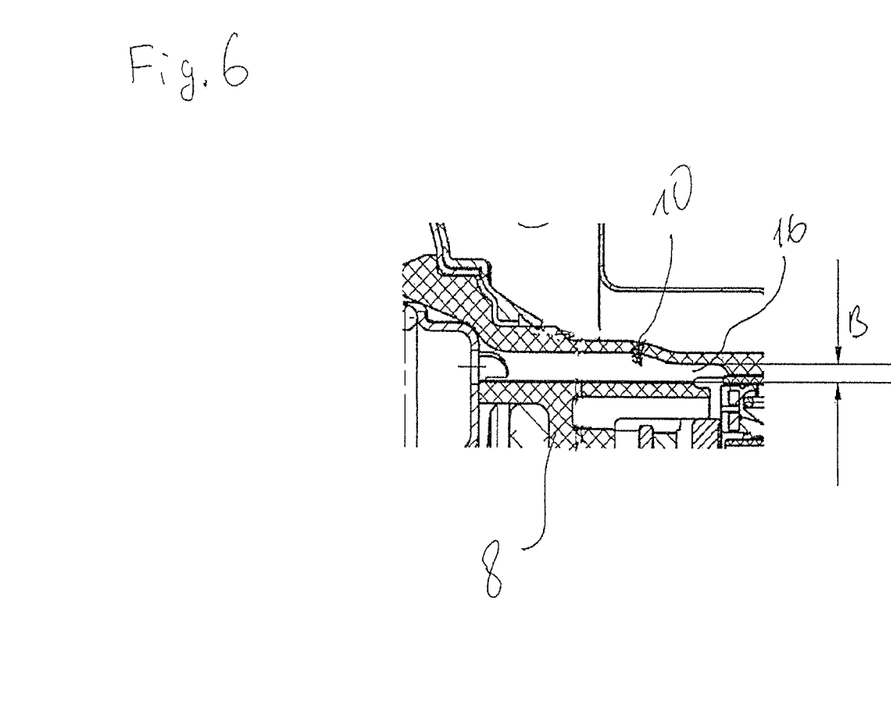
FIG. 6 shows a seventh illustrative embodiment of a brake booster according to an aspect of the invention with a variation in the cross section of the extraction duct in the region of the holder.

FIG. 6

FIG. 6 shows another embodiment, in which a cross-sectional width B of the annular gap 16 can be varied in order to achieve a narrowing of the cross section in the extraction duct 10 and thereby to increase the flow resistance. This is achieved by configuring the injection mold for producing the control housing 8 in such a way that different widths B of the annular gap 16 can be achieved in a particularly simple manner by using different corresponding interchangeable inserts.

It is thereby possible to produce even relatively small batches of control housings 8 with different flow resistance values in the extraction duct 10 quickly and at low cost. The outlay on assembly is not increased since the number of components and the assembly sequences remain the same.

Figure 7:
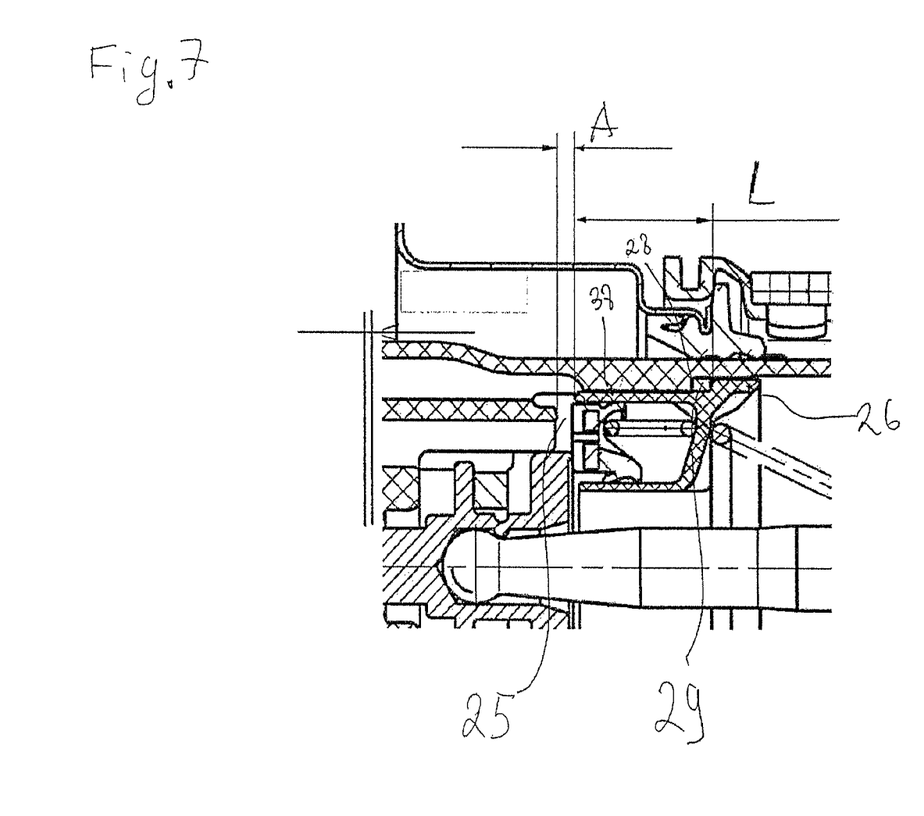
FIG. 7 shows an eighth illustrative embodiment of a brake booster according to an aspect of the invention with variation of holder lengths.

FIG. 7

FIG. 7 shows another embodiment of an aspect of the invention, in which the width A of the extraction gap 25 can be varied by making available a selection of holders 26 that can be produced in a favorable way, each having different lengths L of an outer radial annular surface 38 of the holder 26. Depending on the length L, the annular surface 38 projects to a greater or lesser extent into the extraction gap 25, thereby making it possible to control the flow resistance in the extraction gap 25.

Thus, it is possible to use a holder 26 of appropriate length L to achieve a variant of the brake booster 1 with a desired return speed of the control housing 8.

Figure 8:
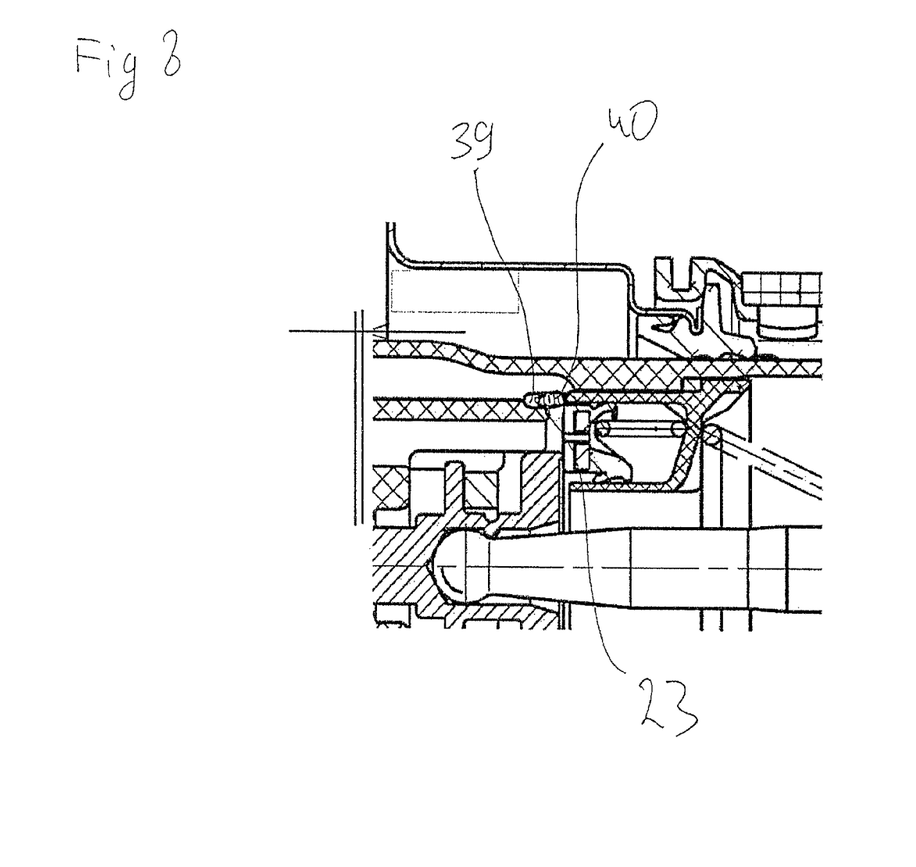
FIG. 8 shows a ninth illustrative embodiment of a brake booster according to an aspect of the invention with a filter ring in a groove in the region of the holder.

FIG. 8

The embodiment in FIG. 8 has another filter ring 40, which is arranged in a sealing edge groove 39 running around the sealing edge 23.

FIG. 9

In the embodiment according to FIG. 9, the widths A of the extraction gap 25 can be varied by making available a selection of valve plungers 22 that can be produced in a favorable way, each having a different length V. A valve plunger 22 strikes against a locking key 41, which is inserted into a groove 42 in the control housing 8. Depending on the length V, a distance between the valve plunger 22 and the disk valve 24 is opened up to a greater or lesser extent during the return of the control housing 8, leading to different through-flow cross sections in the extraction gap 25 and thus to different flow resistances.

Figure 10:
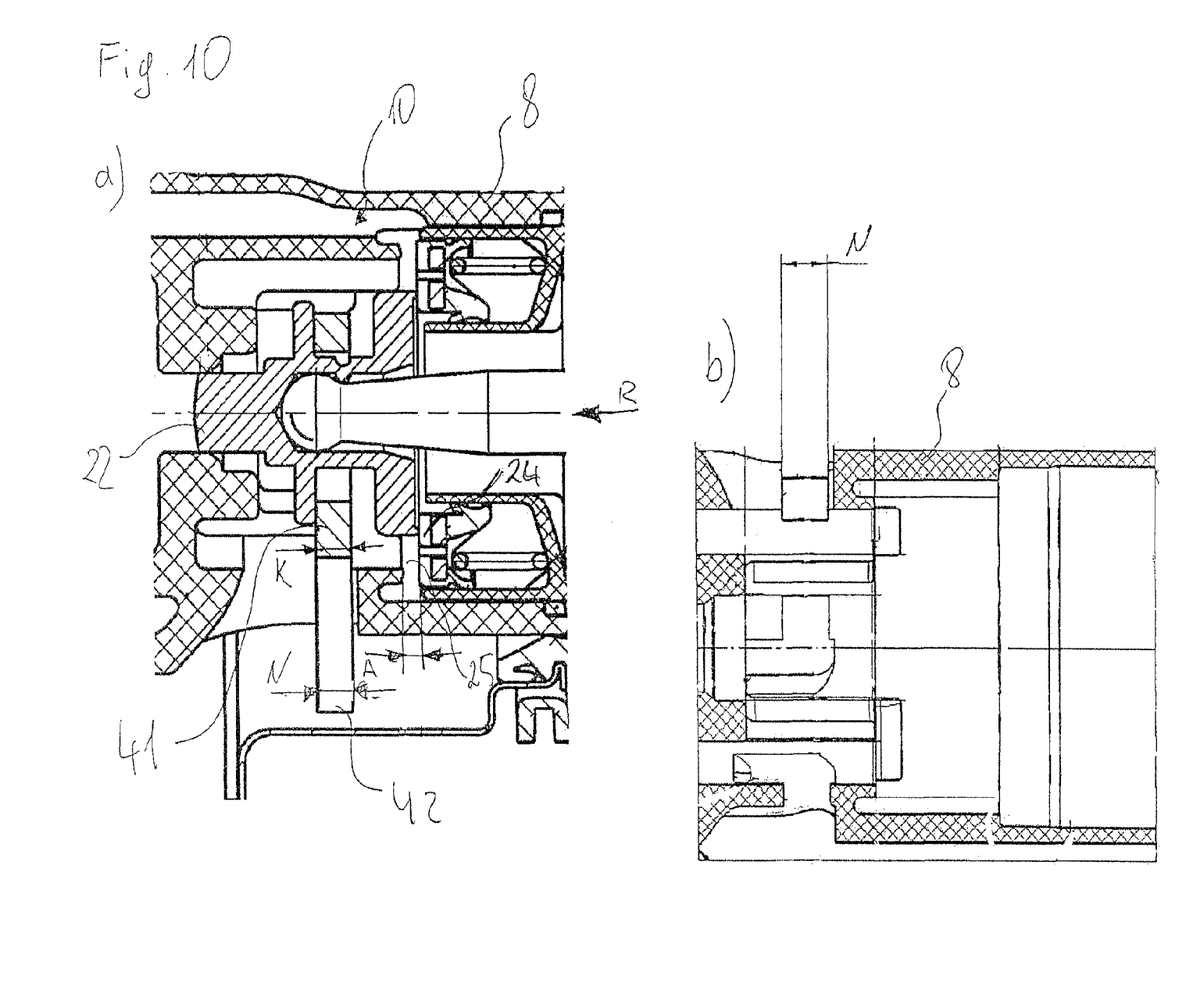
FIG. 10 shows an eleventh illustrative embodiment of a brake booster according to an aspect of the invention with variation of the thickness of the locking key.

FIG. 10

In the embodiment according to FIG. 10, the widths A of the extraction gap 25 and thus also the flow resistance in the extraction duct 10 are varied by making available a selection of locking keys 41, each having a different thickness K. Here, a groove width N of the groove 42 remains unchanged.

Figure 11:
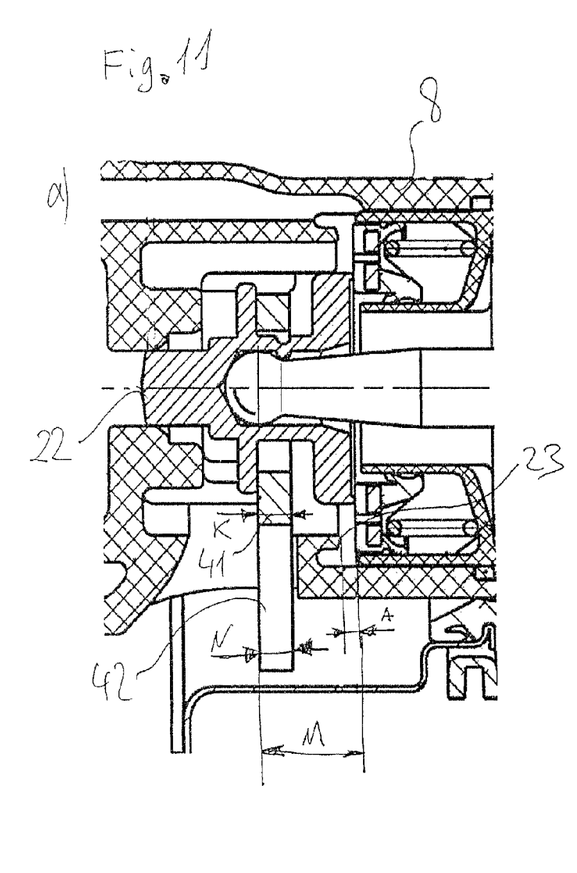
FIG. 11 shows a twelfth illustrative embodiment of a brake booster according to an aspect of the invention with variation of the spacing between the contact of the locking key and the sealing edge of the control valve.

FIG. 11

In the embodiment according to FIG. 11, the distance M between the groove 42 and the sealing edge 23 is varied by using suitable interchangeable inserts in the injection mold for the control housing 8. Here, the groove width N of the groove 42 and the thickness K of the locking key 41 and the valve plunger 22 can remain unchanged. Here, view "a" shows a partial sectional view of the control housing 8 in the assembly, and view "b" shows it as an individual part.

Figure 12:
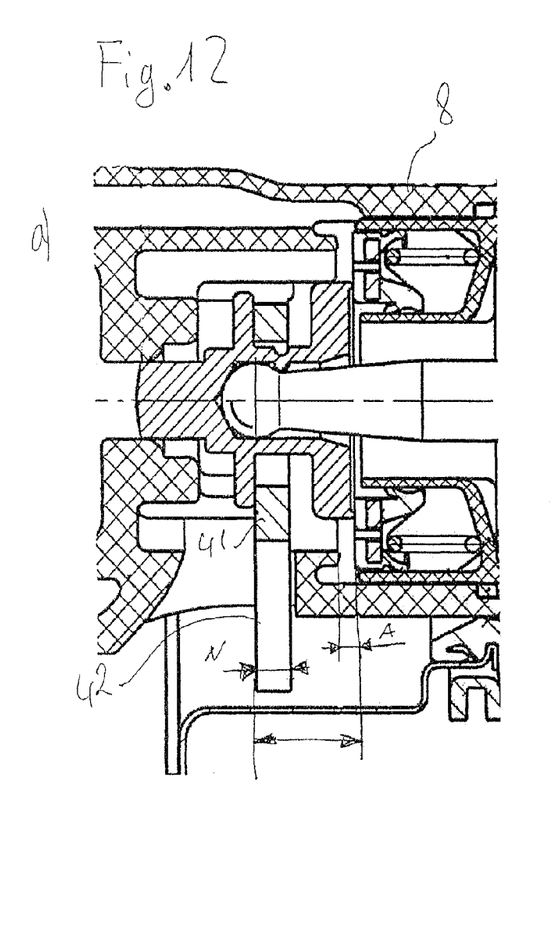
FIG. 12 shows a thirteenth illustrative embodiment of a brake booster according to an aspect of the invention with variation of the key width cutout in the control housing.

FIG. 12

In the embodiment according to FIG. 12, it is a simple matter to implement the groove width N of the groove 42 with a desired dimension through suitable interchangeable inserts in the injection mold for the control housing 8. As in FIG. 11, a section through the subassembly is shown in view "a" and a section through the individual part comprising the control housing 8 is shown in view "b".

Figure 13:
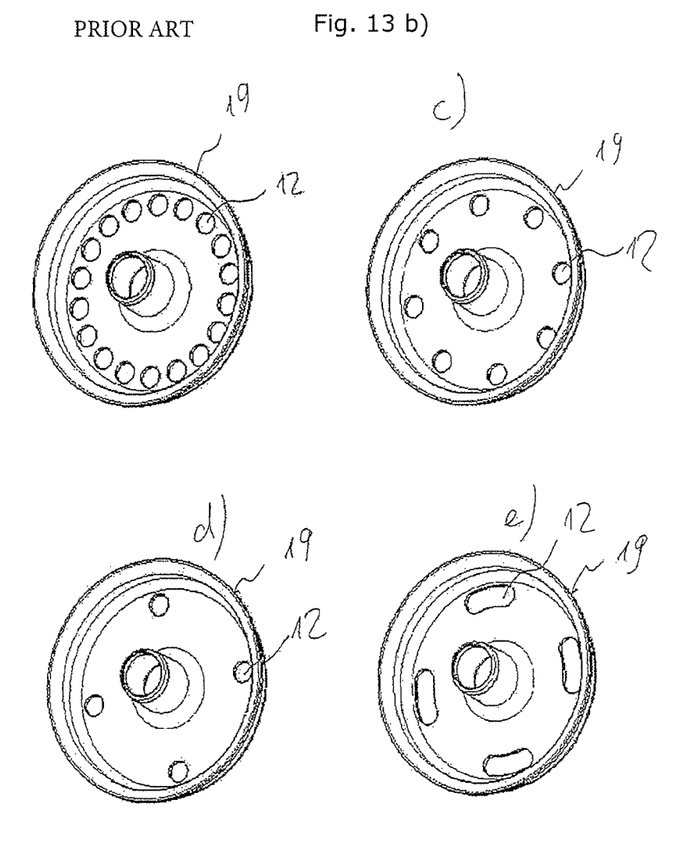
FIG. 13 shows further illustrative embodiments of a brake booster according to an aspect of the invention with variations of guide plates.

FIG. 13

In a basic version of the brake booster 1 guide plate 19, a guide plate 19 with as large as possible a cross-sectional area for the passage of air is generally used. Such an embodiment is shown in view "b".

The cross-sectional area for the passage of air is formed by the sum of the passage area of all the apertures 12.

It is then a particularly simple matter to achieve an increase in the flow resistance in the extraction duct 10 by using the guy plate 19 with a reduced cross-sectional area instead of a cross-sectional area which is as large as possible, which is the aim in the known brake boosters of the type in question. The desired dimension can be achieved by reducing the number of apertures 12 and/or by modifying the contour thereof. Views "c", "d" and "e" show three different possible illustrative embodiments according to the invention, wherein the selection shown is not exhaustive and further embodiments, each with a different number, shape or size of the apertures, is possible within the invention.

REFERENCE SIGNS 1 brake booster
2 booster housing
3 axially movable wall
4 working chamber
5 vacuum chamber
6 diaphragm plate
7 rolling diaphragm
8 control housing
9 control valve
10 extraction duct
11 insert element
12 aperture
13 arcuate element
14 ring element
15 annular groove
16 annular gap
17 connecting duct
18 sealing lip
19 guide plate
20 piston rod
21 return spring
22 valve plunger
23 sealing edge
24 disk valve
25 extraction gap
26 holder
27 stop
28 shoulder
29 intermediate ring
30 housing interior space
31 rib
32 molded extension
33 latching projection
34 recess
35 filter ring
36 filter insert
37 filter tube
38 annular surface
39 sealing edge groove
40 filter ring
41 locking key
42 groove
A width, extraction gap
B cross-sectional width, annular gap
K thickness, locking key L length, annular surface
M distance between groove and sealing edge
N groove width
R actuating direction
V length on the locking key

The invention claimed is:

1. A pneumatic brake booster for a motor vehicle comprising:
   a booster housing the interior space of which is divided by at least one axially movable wall that can be loaded with a pneumatic differential pressure into at least one working chamber and at least one vacuum chamber wherein the movable wall comprises a diaphragm plate and a rolling diaphragm which is arranged sealingly between the booster housing and a control housing
   a control valve which controls the differential pressure, is arranged in the control housing and controls a connection of the working chamber to the vacuum chamber or atmosphere,
   at least one extraction duct which is integrated into the control housing for connection of the vacuum chamber to the working chamber, wherein the extraction duct can be blocked by the control valve, and
   an insert element configured to reduce a hydraulic cross section of the extraction duct between the vacuum chamber and the working chamber, the insert element being fixed in at least one defined circular position in the control housing by at least one recess and a latching projection engaging in the recess.

2. The pneumatic brake booster as claimed in claim 1, wherein the insert element has at least one aperture.

3. The pneumatic brake booster as claimed in claim 1, wherein the insert element is designed as an arcuate element.

4. The pneumatic brake booster as claimed in claim 2, wherein the insert element is designed as a ring element.

5. The pneumatic brake booster as claimed in claim 1, the control housing can be produced in an injection molding process.

6. The pneumatic brake booster as claimed in claim 1, wherein the insert comprises a guide plate with one or more apertures.

7. A pneumatic brake booster for a motor vehicle comprising:
   a booster housing the interior space of which is divided by at least one axially movable wall that can be loaded with a pneumatic differential pressure into at least one working chamber and at least one vacuum chamber wherein the movable wall comprises a diaphragm plate and a rolling diaphragm which is arranged sealingly between the booster housing and a control housing
   a control valve which controls the differential pressure, is arranged in the control housing and controls a connection of the working chamber to the vacuum chamber or atmosphere,
   at least one extraction duct which is integrated into the control housing for connection of the vacuum chamber to the working chamber, wherein the extraction duct can be blocked by the control valve, and
   means for influencing fluid dynamics in the extraction duct between the vacuum chamber and the working chamber, the means being made from a foamed or sintered air-permeable material or containing such a material.

8. The pneumatic brake booster as claimed in claim 7, wherein the means for influencing the fluid dynamics are designed as one or more filter inserts for insertion into the extraction duct.

9. A method for reducing noise emissions from a pneumatic brake booster for a motor vehicle, the pneumatic brake booster comprising:
   a booster housing the interior space of which is divided by at least one axially movable wall that can be loaded with a pneumatic differential pressure into at least one working chamber and at least one vacuum chamber wherein the movable wall comprises a diaphragm plate and a rolling diaphragm which is arranged sealingly between the booster housing and a control housing
   a control valve which controls the differential pressure, is arranged in the control housing and controls a connection of the working chamber to the vacuum chamber or atmosphere,
   at least one extraction duct which is integrated into the control housing for connection of the vacuum chamber to the working chamber, wherein the extraction duct can be blocked by the control valve,
   wherein noises are emitted during a return flow of the control housing, and wherein the method includes
   a first step in a vehicle application in which noise emissions from the brake booster are determined, and
   a further step in which an insert element configured to reduce a hydraulic cross section of the extraction duct between the vacuum chamber and the working chamber is inserted into the extraction duct, wherein the insert element is fixed in at least one defined circular position in the control housing by at least one recess and a latching projection engaging in the recess.

10. The method as claimed in claim 9, wherein the insert comprises a guide plate with one or more apertures.

* * * * *